June 29, 1948.  R. J. VIOLETTE  2,444,075
METHOD FOR CABLE SPLICING
Filed July 18, 1944  2 Sheets-Sheet 1
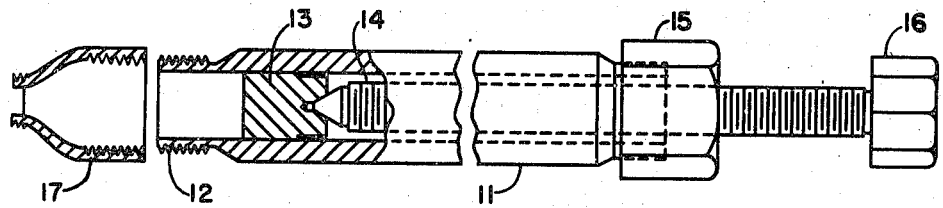
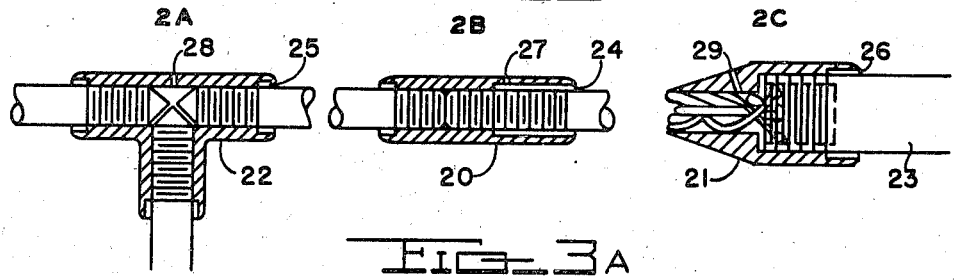
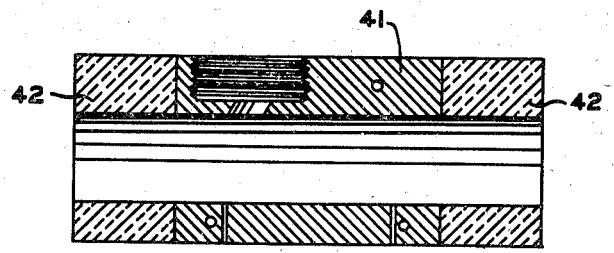
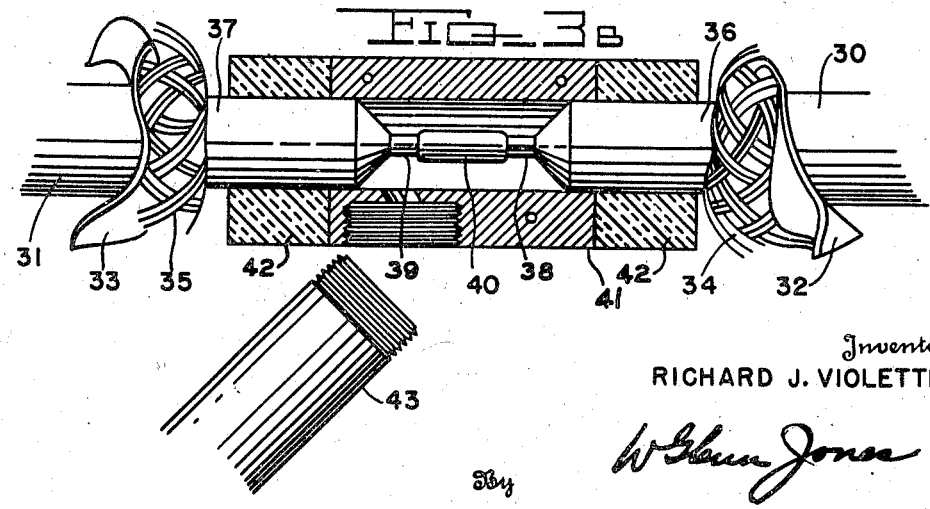
Inventor
RICHARD J. VIOLETTE
By W. Glenn Jones
Attorney June 29, 1948.   R. J. VIOLETTE   2,444,075
METHOD FOR CABLE SPLICING
Filed July 18, 1944   2 Sheets-Sheet 2
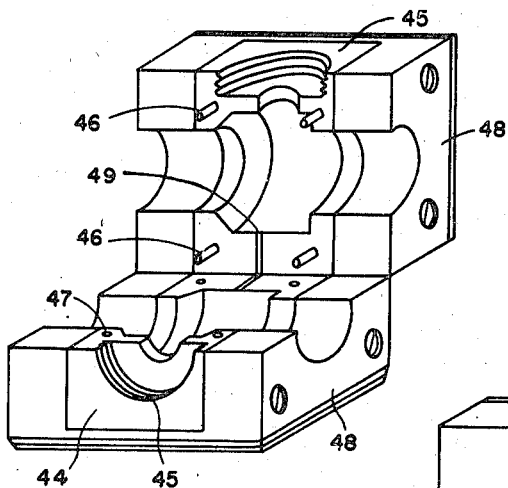
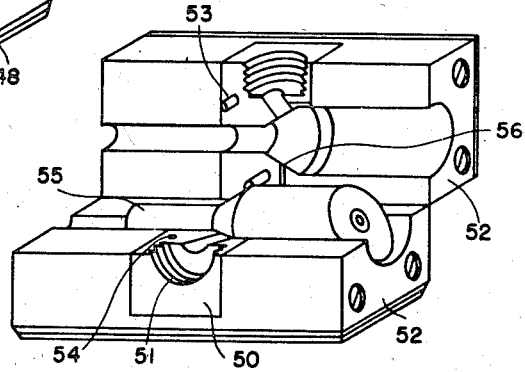
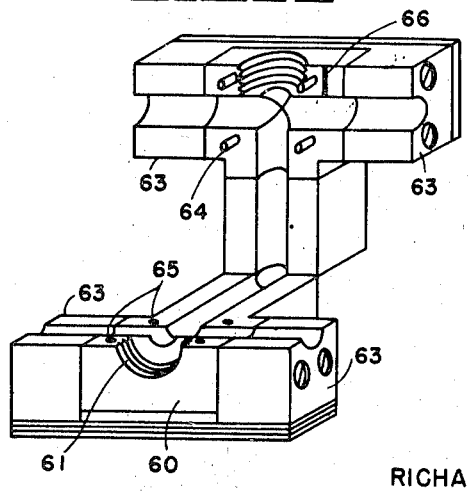
Inventor
RICHARD J. VIOLETTE
By Ralph L. Chappell
Attorney Patented June 29, 1948

2,444,075

UNITED STATES PATENT OFFICE 2,444,075

METHOD FOR CABLE SPLICING

Richard J. Violette, Washington, D. C.

Application July 18, 1944, Serial No. 545,533

4 Claims. (Cl. 154—2.22)

(Granted under the act of March 3, 1883, as amended April 30, 1928; 370 O. G. 757)

This invention relates to the art of cable laying and more specifically to joining and matching of cables for transmission of ultra-high frequency power.

It is the principal object of this invention to provide a method of splicing high frequency cables, which will produce a joint which does not create an electrical discontinuity which would be the cause of reflections in the line.

It is a second object of this invention to provide a method of splicing cables which produces a joint which is an integral part of the line in which it is made, and is thus mechanically strong and weather-proof.

It is a third object of this invention to provide a method of matching lines of different characteristic impedances by splicing them together with no appreciable electrical hump in the spliced line.

It is a fourth object of this invention to provide a method of forming a flange or collar on the outside of a line for use in clamping the line in a stuffing box when it is necessary to pass it through a water-tight bulkhead.

Other objects of the invention will in part be obvious and in part appear hereinafter.

The invention accordingly comprises the several steps and the relation of one or more of such steps with respect to each of the others, and the apparatus embodying features of construction, combinations of elements and arrangements of parts, which are adapted to effect such steps, and the joint which possesses the characteristics, properties and relation of elements all as exemplified in the following detailed disclosure, and the scope of the invention will be indicated in the claims. In the practice of this invention when cable of the coaxial type is joined, the inner conductors of the segments are joined to be made electrically continuous and, following this, the dielectric, the outer conductor, and the outer jacket are re-formed to substantially the mechanical and electrical equivalents of the original cable.

Formerly cables were commonly covered with rubber insulation or dielectric. Pressure of present day war conditions has necessitated the development of substitutes prominent among which are polyethylene and polyvinyl chloride which in many respects are superior to rubber. The method of my invention, set out in detail in the following paragraphs, is applicable to any thermoplastic resin sufficiently workable to be formed into a cable jacket or dielectric.

For a fuller understanding of the nature and objects of the invention reference should be had to the following detailed description taken in connection with the accompanying drawings in which:

Figure 1 is a view in partial section of a dielectric gun used in the splicing method of this invention;

Figure 2 in three parts, 2A, 2B, and 2C, shows a sectional view of conductors joined by means of coupling units preparatory to forming the dielectric around the joints;

Fig. 3A is a cross-sectional view of a mold for splicing cable.

Fig. 3B is a cross-sectional view of the same mold in inverted relation showing a joined cable therein preparatory to forming the dielectric part of the joint.

Figure 4 is an isometric view of a die used for forming a collar or flange on a cable;

Figure 5 is an isometric view of a die for making an impedance matching joint to join a coaxial line of one characteristic impedance to one of a different characteristic impedance. This type of joint is of vital importance in what is popularly called the impedance-matching transformer.

Figure 6 is an isometric view of a die used in making T junctions.

In the drawings there are shown only the most representative types of dies that are used for making joints according to this novel method. Actually right angle, straight-through, X, and Y joints can be made with no substantial modification of the apparatus used.

Referring to Figure 1, which is a diagram of a container for molten dielectric material, the contents of which may be ejected in a manner likened to a grease gum. Said container will be referred to as a dielectric gun, it is designed for use in this method of cable splicing, 11 is the barrel of the gun having a threaded section 12 on its discharge end. Within the barrel 12 of the gun is close-fitting plunger 13 slidable up and down the barrel. The plunger arm 14 passes through a head 15 forming the end of the gun. The handle 16 on the end of the gun may be of any convenient form.

The operation of the gun is evident from its design. Plunger 14, is drawn back, the hollow barrel filled with extrudable or thermoplastic material and the material extruded by working the plunger down. When using the thermoplastic material, heat can be applied to the barrel of the gun by means of electrical heaters as is done with soldering irons, heating pliers, or by means of an open flame. If it is desired to direct the extruded material into a die, the threaded end 12 of the gun can be made to engage a corresponding fitting in the die. If the gun is not made to size, an adapter 17, reducing or expanding, can be added to the gun.

In Figure 2, are illustrated three common splices, which might have to be made in a line, namely, a straight through connection 20, an expansion or reduction 21 and a T-junction 22. In each case illustrated the joint is made by using a fitting like a plumber's coupling. A convenient form of coupling unit is one threaded all the way through with threads of the same direction so that it can be used to join conductors without having to twist the cables. The ends of the conductors to be joined are threaded back far enough to permit the ends of the conductors to abut when the fitting is put in place. The fittings can be undercut as at 24, 25, and 26, and provided with small holes like 27, 29, and 29, to permit sweating the joint with a bit of solder for the additional mechanical strength and efficiency of electrical contact it would add. The conductors that can be joined thus may be solid, hollow or stranded. Also, for very small conductors or multiple strand conductors the fitting can be unthreaded or dispensed with entirely and dependence placed on a twisted or braided joint.

In the figure, joint 21 is an illustration of the method of making impedance matching joints which, when completed leave no detectable electrical hump in the line. Fitting 21 is made to the taper needed to join two conductors having different diameters or characteristic impedances. The larger conductor 23 has its end threaded and hollowed as indicated. A smaller conductor can be fitted closely to the larger by way of the smaller opening in fitting 21 which may or may not be threaded, and the joint sweated with solder.

A solid conductor shown as 23 can be joined to a multi-stranded smaller one by means of fitting 21 by first passing the stranded conductor into place in fitting 21 through the smaller end bending back the strands to form a sort of knot in the larger section to keep the stranded conductor from pulling back through and finally joining the larger conductor to the fitting and soldering the joint.

In Figures 3, 4, 5, and 6 there are shown isometric drawings of the apparatus and steps in the method used in finishing a splice.

Fig. 3A and Fig. 3B show a die containing a pair of cable ends in which the conductors have been joined preparatory to the next step in the splicing operation. The positional relations between Fig. 3A and Fig. 3B as shown is such that Fig. 3A may be rolled down upon Fig. 3B to cover the cable joint and the entire mold will then be assembled. In the drawing, 30 and 31 are the sections of coaxial cable being joined, 32 and 33 the outer jackets, 34 and 35 the outer conductors, 36 and 37 the dielectric separating the inner and outer conductors, and 38 and 39 the inner conductors. The inner conductors are shown joined by a coupling 40 like that shown in Figure 2. The die is shown opened into two matching sections comprising metal cores 41 and heat insulating blocks 42. The details of construction of the die will be explained in conjunction with Figures 4, 5, and 6. A dielectric gun like that shown in Figure 1 is shown partially as 43.

In Figure 4 there is shown an isometric view of a die for use in molding flanges or peripheral collars onto cables in order to give stuffing boxes a strong purchase in holding the cable in place. In this drawing the halves of the die are separated to reveal its structure. The central part of the die 44 is usually a metal concave-shaped piece to form the collar on the cable and is provided with a threaded reducing opening 45 through which the dielectric material can be injected. To provide for a good match when the halves of the die are fitted together, pegs 46 are made to match corresponding holes 47. The part of the die generally indicated by 48 is made of a heat insulating material and its function will be explained in a subsequent paragraph. Insulating material 48 can be "Transite," "Mycalex," asbestos, or silica brick.

Passage 49 is an air outlet passage to permit escape of air from the die when dielectric is injected into it.

In Figure 5 there is illustrated in isometric projection a die for use in splicing together cables of different diameters. In this figure, 50 represents the metallic core of the die, which makes the transformation from one size to the other. Like the die illustrated in Figure 4, this one is also fitted with a threaded reducing opening 51 through which the dielectric material can be injected. The heat insulating material forming a substantial block on either side of the core of the die is indicated by 52. Pegs and matching holes for aligning the halves of the die are designated as 53 and 54 respectively. A cable joint in which a small conductor was joined to one more than twice its diameter is shown in place and designated 55. An air outlet passage is indicated as 56.

In Figure 6 there is shown in isometric projection a die for use in making T joints in cables. In the drawing, 60 represents the metallic core of the die and 61 a threaded reducing opening for receiving a dielectric injecting tool. The metal core of the die is backed up and insulated at its ends by means of blocks of insulating material 63. The two halves of the die are aligned by means of pegs 64 and matching holes 65. An air outlet passage is indicated as 66.

The manner of making splice with these dies can be readily understood by reference to Figures 2 and 3. In Figure 2, one method of joining skinned cables is shown. This rather elaborate operation involving threading the conductors is desirable when the conductor is about one eighth inch in diameter or larger. With smaller sizes smaller unthreaded sleeves or lugs can be used or even carefully twisted joint. Another good method of connecting the cables is by brazing the ends together and then filing the joint down to substantially the same diameter as the rest of the conductor. If the joint is made with sleeves like those shown in Figure 2 the joint should be sweated with solder to perfect the electrical connection.

After the conductors are joined they are laid in a die so that the metal core of the die overlaps the dielectric surrounding the conductor as shown by parts 41, 36 and 37 of Figure 3. In this way the conductor is securely held concentric in the cable. The insulating portion of the die, 42, grasps the dielectric beyond the exposed central conductor and holds it in alignment during the entire molding operation. Once the conductors are joined and the cable set in place, the halves of the die are clamped securely around the cable by means of an ordinary C clamp; an injecting tool charged with dielectric material, shown as 43 in Figure 3, is set into the feed hole of the die, the tool heated to make dielectric plastic and the dielectric forced into the die.

In constructing the dies it is necessary to provide a way for the air to escape from the die as the dielectric is forced into place. These air vents also serve as indicators in that the dielectric will appear when the die has received its full charge and are indicated in Figures 4, 5 and 6 as 49, 56, and 66 respectively. It is essential that the joint be free of air bubbles for at high frequencies residual air causes electrical humps in the line and at high voltages it can be the cause of a breakdown.

In the case of each of the dies shown in Figures 3, 4, 5 and 6 the metal core of the die is thermally insulated at its ends in a manner such that when it is put in place around a cable, a substantial segment of heat insulating material surrounds the cable adjacent to the core of the die. It is important that such provision be made for when molding thermoplastic material around a cable joint, the metal core becomes hot enough to cause dielectric in contact with it to flow. Were the insulating blocks not provided the die would become skewed on the cable and spoil the joint.

A coaxial cable can be spliced by repeating the molding process. That is to say, first the inner conductors are joined; over the joint there is then molded the dielectric after which the outer conductors are spliced; the final step involves placing the cable in a die made to fit the outside diameter of the cable and molding over the spliced outer conductor a new outer jacket.

The same technique is applicable to the splicing of cables of different sizes as shown in Figures 2 and 5. In Figure 2 there is shown a method of joining the conductors of different sizes and in Figure 5 the die used to form dielectric around the joint.

It is often desirable to pass a cable through a bulkhead in a manner such that the bulkhead will remain water-tight. This is accomplished by molding onto the outer jacket a collar extending peripherally around the cable. The die for accomplishing this is shown in Figure 4. It is evident again in this case that successful molding of such a collar requires that the cable remain concentric and in accomplishment of the purpose the die is built with terminal insulators 48, to keep the mold from becoming skewed.

An improved stuffing box for receiving cable having molded thereover such a peripheral collar is described in the copending application Serial No. 545,532, filed July 18, 1944, by Richard J. Violette and Irving H. Page, now Patent No. 2,429,654, dated October 28, 1947.

The advantages of this invention can be summarized as follows:

Splices in cables can be made capable of withstanding voltages equal to those for which the new cable is rated;

Splices in cables can be made so smooth and homogeneous that they will not cause appreciable reflections in the line;

Cables of different sizes can be joined for purposes of impedance matching without having the joint create any substantial electrical hump in the line;

In all the joints made by this method, the dielectric molded over the joined conductors unites with the undisturbed dielectric to form a unitary continuous covering over the conductors;

The dies and accessories used are all small portable pieces and the making of joints can be accomplished in the field by relatively unskilled personnel;

The cores of the dies are small and of low thermal capacity and thus make it unnecessary to heat the die in order to keep the dielectric plastic so it can flow into place;

The dies used are so constructed that they hold the cable concentric in the die during the whole molding operation;

The dielectric trimmed away from the cable preparatory to making the joint can be used to charge the gun or dielectric injection tool, and thus re-molded around the conductors to insure uniformity of composition of the dielectric.

Although certain specific embodiments of this invention have been herein disclosed and described, it is to be understood that they are merely illustrative of this invention, and modifications may, of course, be made without departing from the spirit and scope of the invention as defined in the appended claims.

The invention described herein may be manufactured and used by or for the Government of the United States of America for governmental purposes without the payment of any royalties thereon or therefor.

I claim:

1. In an impedance-matching transformer employing coaxial conductors of different characteristic impedances, but containing dielectric of substantially the same composition, the improvement in making the joints comprising electrically joining the inner conductors, molding a dielectric sheathing over said joined conductors to form a junction of the cable dielectric tapering from the thickness of one cable dielectric to the thickness of the other cable dielectric, said dielectric sheathing having a dielectric of substantially the same composition as that used in the cables, joining the outer conductors so that the completed line has substantially no electrical discontinuities which would contribute to an undesirably high standing wave ratio on the line.

2. A method of splicing ultra high frequency coaxial cable having inner and outer conductors separated by a thermoplastic dielectric, comprising the steps of skinning back the outer conductor from a portion of each cable end, stripping the dielectric from a portion of each cable end down to the inner conductor, joining said inner conductors, injection molding a thermoplastic dielectric sheathing around said joined inner conductors to substantially the thickness of the cable dielectric, said molded dielectric having substantially the same electrical properties as the cable dielectric, and joining said outer conductors.

3. A method of splicing ultra high frequency coaxial cable having inner and outer conductors separated by a thermoplastic dielectric, comprising the steps of, skinning back the outer conductor from a portion of each cable end, stripping the dielectric from a portion of each cable end down to the inner conductor, joining said inner conductors, injection molding the dielectric stripped from said cable ends around said joined inner conductors to substantially the thickness of the cable dielectric, and joining said outer conductors.

4. A method of splicing ultra high frequency coaxial cable having inner and outer conductors separated by a thermoplastic dielectric, comprising the steps of skinning back the outer conductor from a portion of each cable end, stripping the dielectric from a portion of each cable end down to the inner conductor, joining said inner conductors, heating a quantity of thermoplastic dielectrics until it becomes plastic, said quantity of dielectric having substantially the same electrical properties as the cable dielectric, injection molding said heated dielectric around said joined inner conductors to substantially the thickness of the cable dielectric, and joining said outer conductors.

RICHARD J. VIOLETTE.

REFERENCES CITED

The following references are of record in the file of this patent:

UNITED STATES PATENTS

| Number | Name | Date |
|---|---|---|
| 252,249 | Philips | Jan. 10, 1882 |
| 1,314,256 | Ehrenfeld | Aug. 26, 1919 |
| 1,881,785 | Malm | Oct. 11, 1932 |
| 1,939,843 | Darby | Dec. 19, 1933 |
| 2,059,055 | Studt | Oct. 27, 1936 |
| 2,116,266 | Horn | May 3, 1938 |
| 2,184,630 | Alexander | Dec. 26, 1939 |
| 2,287,163 | Bishop | June 23, 1942 |
| 2,322,903 | Wilkoff | June 29, 1943 |
| 2,379,318 | Safford | June 26, 1945 |